United States Patent
Jamkhedkar et al.

(10) Patent No.: US 11,356,329 B2
(45) Date of Patent: Jun. 7, 2022

(54) NETWORK INTENT SYNTHESIS

(71) Applicant: AT&T Intellectual Property I, L.P., Atlanta, GA (US)

(72) Inventors: Pramod Jamkhedkar, Bridgewater, NJ (US); Muhammad Bilal Anwer, Branchburg, NJ (US); Rakesh Sinha, Edison, NJ (US); Bingzhe Liu, Champaign, IL (US); Kostas Oikonomou, Colts Neck, NJ (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 9 days.

(21) Appl. No.: 16/898,114

(22) Filed: Jun. 10, 2020

(65) Prior Publication Data

US 2021/0392047 A1    Dec. 16, 2021

(51) Int. Cl.
*H04L 41/0893* (2022.01)
*G06F 16/901* (2019.01)
(Continued)

(52) U.S. Cl.
CPC ...... *H04L 41/0893* (2013.01); *G06F 16/9024* (2019.01); *H04L 41/145* (2013.01); *H04W 24/02* (2013.01)

(58) Field of Classification Search
None
See application file for complete search history.

(56) References Cited

U.S. PATENT DOCUMENTS

| 7,747,730 B1* | 6/2010 | Harlow | C09B 43/06 709/224 |
| 2009/0178021 A1* | 7/2009 | Alluri | G06F 11/3684 717/104 |

(Continued)

OTHER PUBLICATIONS

Balunovic, et al., "Learning to Solve SMT Formulas", Department of Computer Science, ETH Zurich, Switzerland, 32nd Conference on Neural Information Processing Systems, Montreal Canada, (Neur IPS 2018).

(Continued)

*Primary Examiner* — Lance Leonard Barry
*Assistant Examiner* — Mohammad Yousuf A. Mian

(57) ABSTRACT

A processing system may obtain an intent comprising a desired network state for a telecommunication network, determine an existing network state, where the desired network state and the existing network state are defined in accordance with a graph representing the telecommunication network, where the graph includes objects and relationships between the plurality of objects, and where each of the objects includes one or more properties. The processing system may compose a strategy that includes a plurality of policies to obtain the desired network state from the existing network state, where each of the policies comprises an action that is to be implemented in the telecommunication network, where the composing comprises performing a state exploration process over the graph, and where each state transition of the process corresponds to one of the policies. The processing system may then implement the strategy to place the telecommunication network in the desired network state.

20 Claims, 5 Drawing Sheets

(51) Int. Cl.
*H04L 41/14* (2022.01)
*H04W 24/02* (2009.01)

(56) References Cited

U.S. PATENT DOCUMENTS

| | | | | |
|---|---|---|---|---|
| 2017/0041870 | A1* | 2/2017 | Chen | H04W 24/08 |
| 2017/0126500 | A1* | 5/2017 | Eggen | H04L 41/16 |
| 2019/0173805 | A1* | 6/2019 | Balan | H04L 45/28 |
| 2020/0313980 | A1* | 10/2020 | A | H04L 41/0681 |
| 2020/0382387 | A1* | 12/2020 | Pasupathy | H04L 41/5019 |

OTHER PUBLICATIONS

Kautz, Henry; Selman, Bart. BLACKBOX: A New Approach to the Application of Theorem Proving to Problem Solving. Working notes of the Workshop on Planning as Combinatorial Search, held in conjunction with AIPS-98, Pittsburgh, PA, 1998.
The ACSys Group, About CVC4, http://cvc4.cs.stanford.edu/wiki/About_CVC4. May 8, 2018.
Wikipedia contributors. (Dec. 12, 2019). Graphplan. Wikipedia. https://en.wikipedia.org/wiki/Graphplan.
Wikipedia contributors. "Predicate (Mathematical Logic)." Wikipedia, Mar. 9, 2021, en.wikipedia.org/wiki/Predicate_(mathematical_logic).
Aneta Vulgarakis Feljan, et al., "Tackling IoT complexity with Machine Intelligence", Ericsson Technology Review, Cognitive Automation as an IoT Enabler, #4, 2017.
Wang, et al., "Q-Grap plan: QoS-Aware Automatic Service Composition With the Extended Planning Graph", IEEE Access, vol. 8, pp. 8314-8323, Jan. 1, 2020. https://ieeexplore.ieee.org/document/8947915.
LaValle, Steven. "2.4.1 A STRIPS-Like Representation." The Grainger College of Engineering Computer Science, 2006, planning.cs.uiuc.edu/node59.html.
Ghallab, et al., "PDDL—The Planning Domain Definition Language", AIPs-98 Planning Competition Committee, Version 1.2, Yale Center for Computational Vision and Control Tech Report, CVC TR-98-003/DCS TR-1115, Oct. 1998.
Arusoaie, et al., "Using SMT Solvers to Validate Models for AI Problems", Alexandru Aoan University of Iasi, arXiv:1903.09475v1 [cs.AI], Mar. 22, 2019.

* cited by examiner

NETWORK INTENT SYNTHESIS

The present disclosure relates generally to telecommunication network operations, and more particularly to methods, computer-readable media, and apparatuses for implementing a plurality of policies according to a strategy composed in accordance with a state exploration process to place a telecommunication network in a desired network state.

BACKGROUND

Currently if network operators want a network to behave in a certain way, they need to design a set of low level policies or control loops. An example of desired behavior is that certain cells of a base station should be powered down to save energy cost when there is less traffic. If an operator wants to achieve this in a cellular network, the operator may manually create a set of low level policies and then decide when and in what order these policies should be applied. This process is onerous, requiring a lot of time and effort. It is also error prone because the operator may have no formal way to guarantee that a selected set of policies will achieve a desired behavior.

SUMMARY

Examples of the present disclosure include methods, computer-readable media, and apparatuses for implementing a plurality of policies according to a strategy composed in accordance with a state exploration process to place a telecommunication network in a desired network state. For instance, in one example, a processing system including at least one processor may obtain a selection of an intent comprising a desired network state for a telecommunication network, determine an existing network state of the telecommunication network, where the desired network state and the existing network state are defined in accordance with a graph that represents the telecommunication network, where the graph comprises a plurality of objects and a plurality of relationships between the plurality of objects, and where each of the plurality of objects comprises one or more properties. The processing system may further compose a strategy that includes a plurality of policies to obtain the desired network state from the existing network state, where each of the plurality of policies comprises an action that is to be implemented in the telecommunication network, where the composing comprises performing a state exploration process over the graph, and where each state transition of a plurality of state transitions of the state exploration process corresponds to a policy of the plurality of policies. The processing system may then implement the plurality of policies according to the strategy, where the implementing is to place the telecommunication network in the desired network state.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
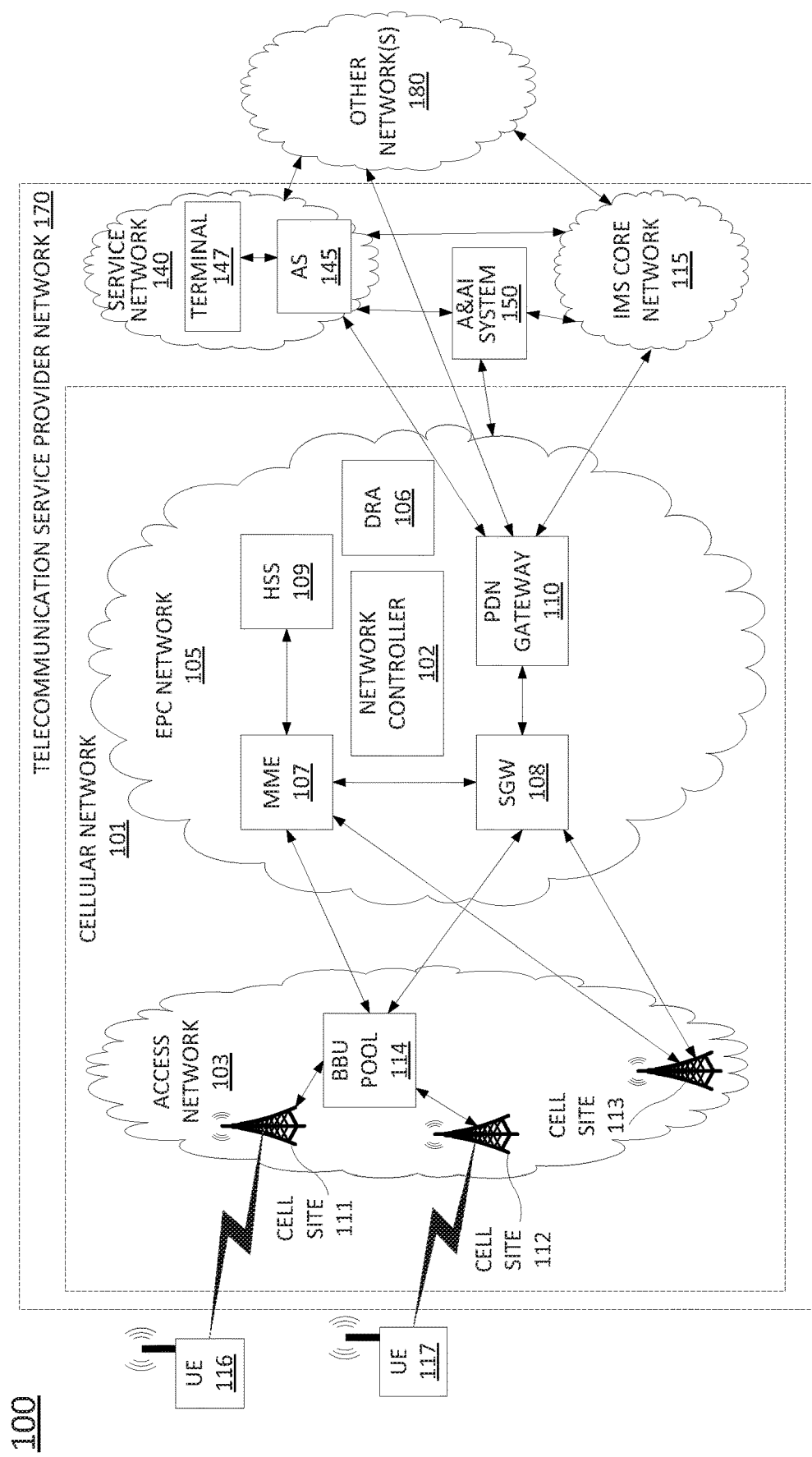
FIG. 1 illustrates an example of a system including a telecommunications service provider network, according to the present disclosure.

Examples of the present disclosure include methods, non-transitory (i.e., tangible and/or physical) computer-readable media, and apparatuses for implementing a plurality of policies according to a strategy composed in accordance with a state exploration process to place a telecommunication network in a desired network state. In particular, examples of the present disclosure provide automated network intent verification which includes several aspects. For instance, in one aspect a network domain is described as an graph (e.g., an entity relationship graph), in which the graph includes objects (e.g., entities) representing components of a telecommunication network, and in which each of the objects has properties (which may include configurations or settings), and relationships among the objects, representing the connections and associations among the objects (e.g., links in the telecommunication network, or the network topology, as well as hierarchical relationships, such as management relationships, host/guest relationships, etc., functional/logical relationships, and so forth). Thus, such a graph represents the network state and topology of the telecommunication network. In one example, the present disclosure includes a schema to declaratively describe intents as logical formulas for the desired state of the telecommunication network.

In addition, in one example, the present disclosure includes a state exploration process to select a strategy comprising a set of policies from a knowledge-base, and a plan on when and how to apply these policies. In one example, the present disclosure further includes a methodology to formally guarantee that the set of policies/strategy will achieve the desired intent. For instance, the present disclosure may include a pre-defined knowledge base with policies (e.g., low-level, and/or atomic policies) and domain information about the telecommunication network. For instance, the policies may be created by experts or auto-generated. Examples of domain information may be a list of virtual machines (VMs) and zone/region for each virtual network function (VNF), radio information about each eNodeB (eNB), etc. In one example, the domain information may be derived from network inventory systems like an active and available inventory (A&AI) system, or the like.

Examples of the present disclosure enable network operators, clients, and end-users to specify desired network behavior without having detailed domain knowledge. Manually creating and managing policies and policy strategies (deciding on which policies to apply and in what order) to achieve high-level intent is a complex task, which may require a skilled individual, who not only understands the network but who also has experience in policy specification systems and who can apply logic to make sure that the interactions of low-level policies have a desired effect. In contrast, examples of the present disclosure enable operators to specify an intent in a high-level language, and the system will automatically generate a strategy composed of policies, and execute the strategy to achieve the intent. In one example, the present disclosure facilitates dynamic changes in the high-level intent (e.g., in response to changes in the network domain and conditions) and provides for efficient and safe use of policies within the telecommunication network. Examples of the present disclosure may also reduce errors because the automation may guarantee that the selected policies achieve the intent and do not have any undesired side-effects. These and other aspects of the present disclosure are discussed in greater detail below in connection with the examples of FIGS. 1-5.

To better understand the present disclosure, FIG. 1 illustrates an example network, or system 100 in which examples of the present disclosure may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs) (e.g., including antennas), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one example, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter Routing Agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

Figure 4:
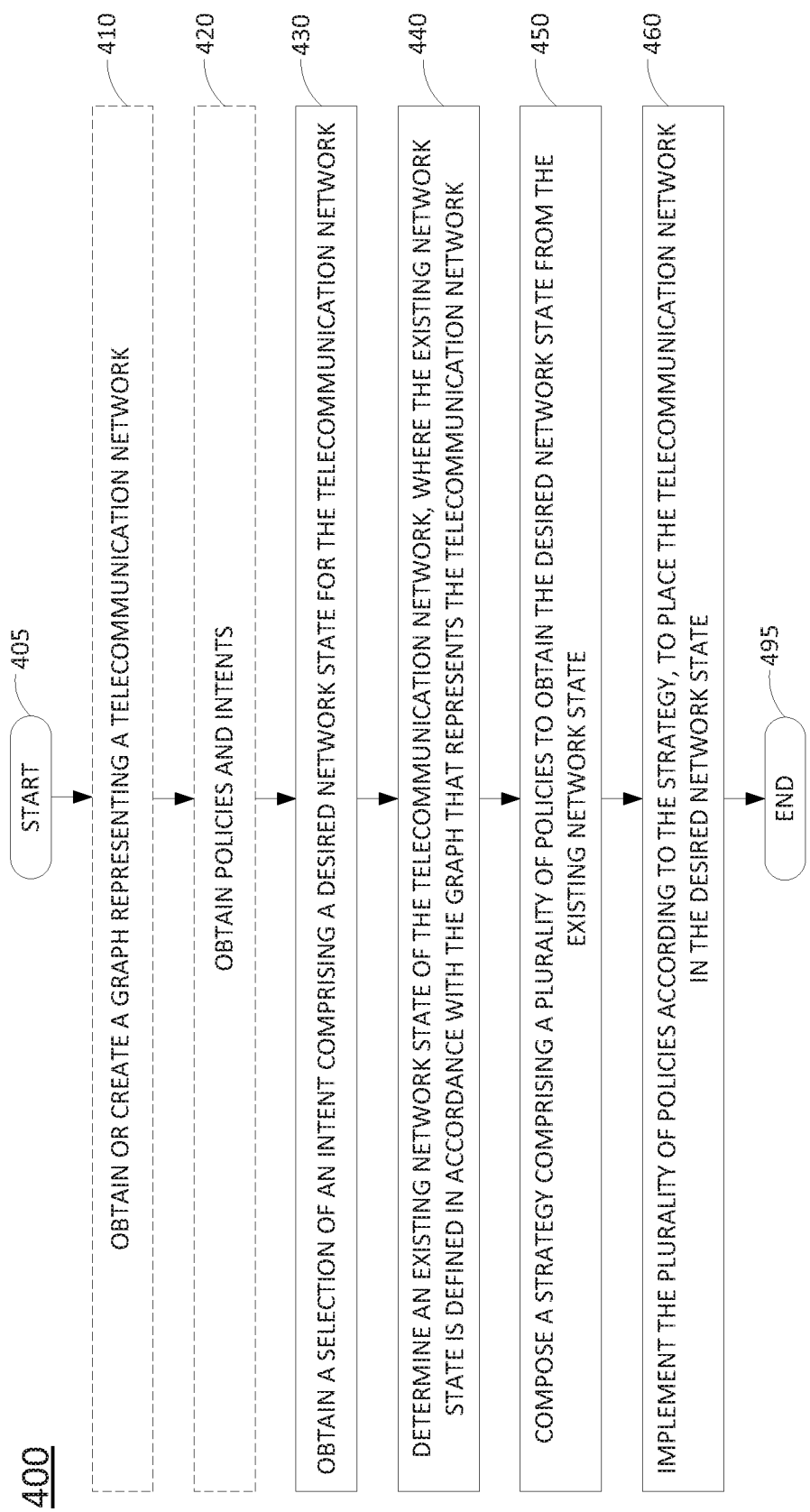
FIG. 4 illustrates a flowchart of an example method for implementing a plurality of policies according to a strategy composed in accordance with a state exploration process to place a telecommunication network in a desired network state.

In one example, service network 140 may comprise one or more devices, such as application server (AS) 145 for providing services to other components of telecommunication service provider network 170, to network operations personnel, to subscribers, customers, and/or end-users, and so forth. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to perform various operations for implementing a plurality of policies according to a strategy composed in accordance with a state exploration process to place a telecommunication network in a desired network state, in accordance with the present disclosure. For instance, and example method for implementing a plurality of policies according to a strategy composed in accordance with a state exploration process to place a telecommunication network in a desired network state is illustrated in FIG. 4 and described in greater detail below. Although a single application server, AS 145, is illustrated in service network 140, it should be understood that service network 140 may include any number of components to support one or more services that may be provided by the telecommunication service provider network 170.

Figure 5:
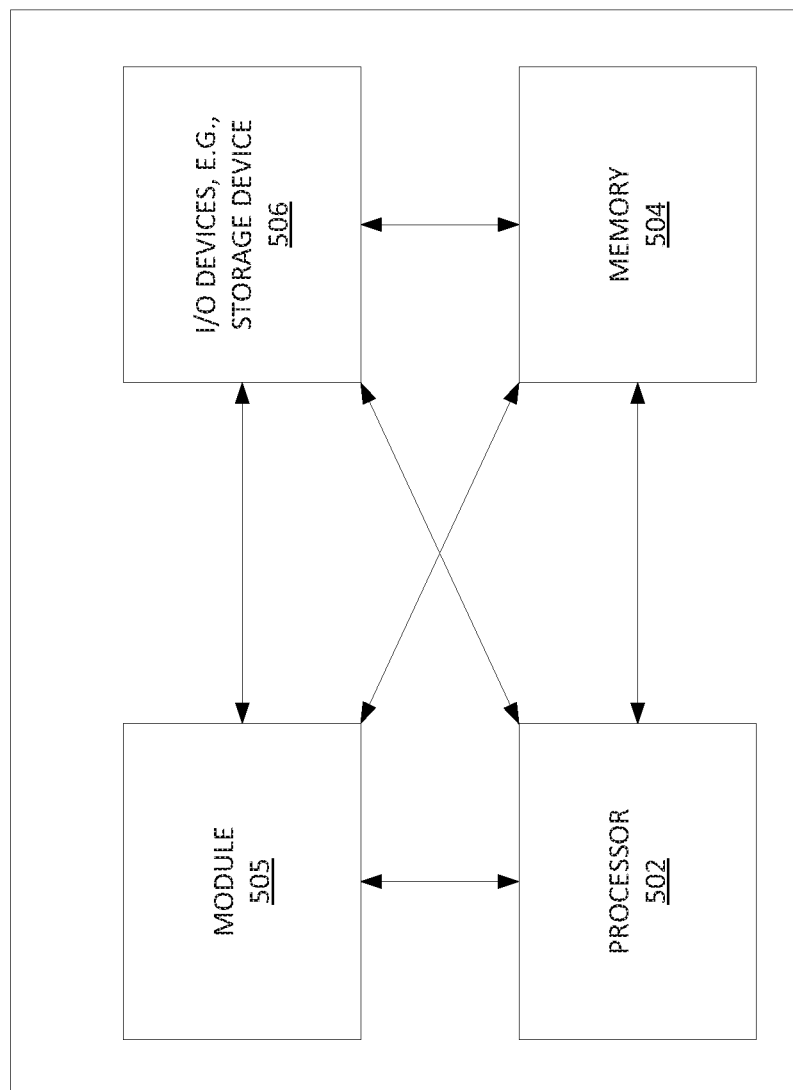
FIG. 5 illustrates a high-level block diagram of a computing device specifically programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below, and which may include central processing units (CPUs), graphics processing units (GPUs), programmable logic devices (PLDs), and so forth) or multiple computing devices collectively configured to perform various steps, functions, and/or operations in accordance with the present disclosure.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise a network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a network controller 102, e.g., a self-optimizing network (SON) and/or a software defined network (SDN) controller. For instance, in one example network controller 102 may function as a self-optimizing network (SON) orchestrator that is responsible for activating and deactivating, allocating and deallocating, and otherwise managing a variety of network components. In one example, network controller may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

In one example, telecommunication service provider network 170 further includes an active and available inventory (A&AI) system 150. The A&AI system 150 may comprise a computing system or server, such as computing system 500 depicted in FIG. 5, and may be configured to provide one or more operations or functions in connection with examples of the present disclosure for implementing a plurality of policies according to a strategy composed in accordance with a state exploration process to place a telecommunication network in a desired network state. In one example, A&AI system 150 may comprise a distributed data storage and/or processing system comprising one or more servers at a same location or at different locations, e.g., a Hadoop® Distributed File System (HDFS™), or the like.

For instance, A&AI system 150 may obtain network topology information (e.g., connectivity information), as well as services and resources information for various physical and virtual components of telecommunication service provider network 170. The data gathered and stored by A&AI system 150 may be obtained from various devices in the telecommunication service provider network 170. For instance, the components may send attributes and connectivity information to A&AI system 150. In one example, the components may send attributes and connectivity information to aggregation points, which may forward the attributes and connectivity information to A&AI system 150.

In one example, the A&AI system 150 may store gathered information in a graph (e.g., a graph database). In one example, the graph may be constructed and maintained by the A&AI system 150 in accordance with a schema, e.g., a set of rules regarding the types of nodes/vertices in the graph database (broadly "objects") and the attributes of the nodes/vertices, the types of relationships between nodes/vertices, the types of properties and labels that may be associated with nodes/vertices and the relationships, and so forth. The schema may also be defined to imply a hierarchy of nodes/vertices. For instance, nodes/vertices may be arranged in layers/levels, such as cloud regions, rack tenants, physical servers, and virtual machines (VMs) (such as VNFs), where rack tenants may be child nodes/vertices of cloud regions, physical services may be child nodes/vertices of rack tenants, and so forth. Thus, for example, when a new VNF is instantiated on a host device by network controller 102 (e.g., as an SDN controller), the A&AI system 150 may receive notification of the new VNF. For instance, the notification may come from the host device, from network controller 102, from an aggregation point, etc.

The A&AI system 150 may then create a new vertex in the graph for the VNF and add the vertex in the appropriate position in the graph (e.g., the graph database). For example, the vertex for the VNF may be added as a child of a vertex for the host device (e.g., a physical server) in accordance with the schema. For instance, an edge between the vertex for the host device and the vertex for the VNF may include the label "is child of" or "is hosted on." The A&AI system 150 may perform similar operations to remove nodes/vertices and edges (e.g., when a VNF is released, when a physical server is removed from service, etc.), to update edges (e.g., when two physical servers in operation obtain a new connection, when a bandwidth between physical servers is increased, etc.), to update nodes (e.g., when additional memory, processor resources, storage resources, or the like are added or when such resources are removed), and so on.

In one example, AS 145 may obtain performance indicators directly from RAN components (e.g., from access network 103, etc.) and/or from other components of telecommunication service provider network 170. For instance, eNodeBs may collect performance indicators which may be obtained via vendor API(s) via push or pull functions. The performance indicators may be further processed, for instance, by averaging, sampling, etc. The respective performance indicators, as obtained from the RAN or other network component(s) and/or as further processed, may then be utilized as state information, depending upon the particular use cases and the configuration(s) of AS 145, network controller 102, A&AI system 150, etc.

As noted above, AS 145 may perform operations for implementing a plurality of policies according to a strategy composed in accordance with a state exploration process to place a telecommunication network in a desired network state, as described herein. To illustrate, in one example, AS 145 may obtain from A&AI system 150 a graph (e.g., a graph database) representing telecommunication service provider network 170 (or at least a portion thereof, such as both access network 103 and EPC network 105, or access network 103 individually, EPC network 105 individually, IMS core network 115 individually, etc.). In one example, AS 145 may update and/or modify the graph, or create a new graph based upon the graph obtained from A&AI system 150 to additionally include state information relating to various aspects of the telecommunication service provider network 170, e.g., as "properties" of various "objects." For instance, in one example, AS 145 may obtain state information from any one or more of cell sites 111-113 in access network 103 (e.g., a radio access network (RAN)), from any one or more devices in EPC network 105, IMS core network 115, etc.

In one example, the state information may comprise current settings of various configurable parameters of various components. The various parameters may include cell site scheduling options (e.g., choices among Media Access Control (MAC) scheduling algorithms), cell handover offset (HO) configurations, sector tilt, power on/off settings for cells, sectors, and/or RRHs, a number of BBUs (e.g., from BBU pool 114), and so on. The state information may also include statuses of whether certain actions have been performed, such as: "pre-processed" or "not pre-processed," to indicate whether a cell has been preprocessed via a preprocess policy/action, "cell tagged" or "not cell tagged" to indicate whether a cell has been tagged via a cell tag policy/action, "cell reconfigured" or "cell not reconfigured" to indicate whether a cell has been reconfigured via a cell reconfiguration policy/action, "sector tagged" or "not sector tagged" to indicate whether a sector has been tagged via a sector tag policy/action, a "sleep optimized" or "not sleep optimized" tag to indicate whether a sector has been sleep-optimized via a sleep optimization policy/action, and so forth.

In one example, the state information may also include performance indicators associated with various "objects" in the graph (e.g., components, groups of components, regions, etc.), including cell level performance indicators, such as throughput, uplink and/or downlink volume/throughput, video user downlink throughput (video specific), radio frequency (RF) conditions, physical resource block (PRB) and/or control channel element (CCE) utilization, active UEs, neighbor relations, handovers, frequency, bandwidth, user geographic distribution, historical information, reference signal received power (RSRP), reference signal received quality (RSRQ), and/or channel quality information (CQI) distribution, timing advance (TA) distribution, cell bitrate, harmonic UE throughput, throughput gap (difference between maximum and minimum UE throughputs), worst throughput, cluster harmonic throughput, a weighted sum of the foregoing, etc.

In one example, the present disclosure may utilize a data streaming platform for distributing state information, e.g., to one or more system, such as AS 145. For instance, Apache Kafka (herein referred to as Kafka) is a streaming platform that enables applications to stream messages to "topics." Topics in Kafka are message queues where each message being published to the topic is published to all the applications that are subscribed to the topic. These publishers act as producers, and the subscribers are consumers. Such producers and consumers may be arranged to build complex real-time streaming data pipeline architectures. Thus, components of telecommunication service provider network 170 may comprise "producers" (e.g., the components themselves, or aggregation points) and AS 145 may comprise at least one "consumer."

In one example, AS 145 may store predefined policies (e.g., each of the plurality of policies having a "precondition" and a "post-condition") and predefined intents. For instance, the predefined policies may include: a preprocess policy, a cell tag policy, a cell reconfiguration policy, a sector tag policy, a sleep optimization policy, and so forth. In one example, each of the preconditions and post-conditions is defined as logical expression comprising a predicate on a domain represented by the graph or a literal on the domain represented by the graph (e.g., a predicate may comprise a Boolean expression with variables comprising information taken from the graph (e.g., representing network state), while a literal may comprise an atomic formula (or its negation), which in one example, can be a predicate symbol applied to terms/variables from the graph information). In addition, each of the policies may comprise an action (e.g., an automated action) that may be implemented in the telecommunication network. In particular, the actions may include atomic actions, e.g., configuration options/settings for different configurable parameters of the RAN, including: MAC scheduler algorithms, handover offsets, power on/off, transmit power, tilt, etc. In one example, the actions may include a plurality of sub-policies/sub-actions (broadly "a set of actions") to be performed as a group. For instance, each sub-policy/sub-action may itself comprise an atomic action, or a sequence of multiple atomic actions. In any case, the available policies/actions that may be selected by AS 145 may be predefined, e.g., by network operations personnel, where each available policy/action has a "signature" defined by a "precondition" and a "post-condition." For example, a sector tag policy may have a precondition of tagged(cell) and a post-condition of tagged(sector). In other words, in order for the sector tag policy to be invoked, the cell tag policy may first be performed in order for tagged(cell) to be true, upon which the sector tag policy is a viable action. Otherwise, the sector tag policy may not be invoked since the precondition is not true.

Similarly, AS 145 may store predefined intents, which are high-level (or at least higher-level) goals that may be achieved via utilization of multiple policies. The intents may be, for example: "energy savings," "coverage optimization," "traffic offload," "blacklisting," "safe-guard," "reboot," and so forth. In one example, the intents may be defined by a desired network state (e.g., characteristics of the telecommunication service provider network 170) as represented by a state of the graph representing the telecommunication service provider network 170. In one example, the available intents may also be defined by a level of the intent, such as conservative-moderate-aggressive, a range or level between 1-5, a range or level between 1-10, etc. For instance, a first available intent may comprise "conservative energy savings" while a second available intent may comprise "aggressive energy savings." In one example, network operations personnel may select and deploy intents via user terminals in communication with AS 145. For instance, in one example, a user, e.g., network operations personnel, may select an intent from the available intents, e.g., via a user interface at terminal 147 and convey the intent to AS 145. AS 145 may then compose a strategy comprising a set, or sequence, of policies from among the available policies, to achieve the intent. For example, AS 145 may apply a state exploration process, such as described below and illustrated in FIG. 3.

In one example, the state exploration process may be implemented via a satisfiability modulo theories (SMT) solver, such as Stanford Research Institute Problem Solver (STRIPS), a CVC3 solver, a CVC4 solver, a SATPLAN solver, a BLACKBOX solver, a Graphplan solver, or the like. The states to be explored are possible states of the graph representing the telecommunication service provider network 170 (or at least the portion thereof) and the possible transitions between states correspond to the available policies/actions. In one example, the state exploration process begins with an existing network state as known to AS 145. The possible states (e.g., simulated network states) that are visited via the state exploration process may include changes as indicated by the respective policies/actions, e.g., for each state change corresponding to a considered policy/action, the respective post-condition for the policy/action becomes true. In one example, the state exploration process ends when a simulated network state is obtained that comprises the desired network state as defined by the selected intent. The result of the state exploration process is a strategy which can place the telecommunication service provider network 170 in the desired network state according to the intent, e.g., starting from the existing network state and applying the sequence/set of policies according to the strategy.

In one example, AS 145 may apply the strategy, e.g., the set/sequence of policies in the determined order, via one or more instructions to network controller 102. For instance, AS 145 may communicate with network controller 102 to provide one or more instructions to implement the set of policies, where the network controller 102 may communicate with cell sites 111-113 and/or any one or more components thereof, such as eNodeB's, remote radio heads (RRHs), BBU pool 114, etc. via one or more respective control interfaces (e.g., vendor APIs) to remotely adjust settings for various configurable parameters in accordance with the policies/actions. For instance, one possible action may be a selection from among five different scheduling algorithms that are available to apply at a cell site (e.g., at an eNodeB). For instance, five vendor-provided scheduling algorithms (e.g., MAC scheduling algorithms) may broadly comprise different strategies for balancing between fairness and efficiency. Other actions may comprising changing, setting, and/or confirming power on/off options for one or more of cell sites 111-113, the number of active RRHs and/or BBUs from BBU pool 114, tilt angles for RRHs, etc. Actions may relate to configurable parameters having discrete action spaces (e.g., on-off, high-medium-low, etc.), or continuous action spaces (e.g., tilt angles ranging from 0 to 20 degrees, transmitter power from 10-50 dBm, handover offsets, etc.). It should be noted that the network operations personnel who may select the intent via terminal 147 may not be required to have detailed implementation and/or domain knowledge such as possessed by the network operations personnel who may define the policies and intents. Rather, the network operations personnel selecting the intent may more simply choose from among available options via a user interface, and the AS 145 (and/or AS 145 in conjunction with other components of telecommunication service provider network 170) may determine how to achieve the intent, and may automatically execute the strategy to do so.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, network controller 102 may be spilt into separate components to operate as a SON orchestrator and a SDN controller, respectively. Similarly, although the network controller 102 is illustrated as a component of EPC network 105, in another example network controller 102, and/or other network components may be deployed in an IMS core network 115 instead of being deployed within the EPC network 105, or in other portions of system 100 that are not shown, while providing essentially the same functionality. Similarly, AS 145 may be alternatively deployed as an additional component of EPC network 105, access network 103, etc. In on example, functions of different components may be combined into a single device, or into a lesser number of devices than as shown in FIG. 1, or may be distributed among a plurality of physical devices which collectively provide the above functions of AS 145. For instance, in one example, AS 145 may represent a processing system comprising a plurality of devices to collectively perform operations for implementing a plurality of policies according to a strategy composed in accordance with a state exploration process to place a telecommunication network in a desired network state, as described herein. In one example, functions described above with regard to AS 145 may alternatively or additionally be performed by network controller 102. For example, network controller 102 may include a SMT solver to obtain a graph representing telecommunication service provider network 170 and an intent, and to determine and implement a strategy comprising a set/sequence of policies, e.g., addition to other functions of network controller 102.

In still another example, it should be noted that AS 145 may be designated for a particular zone or region of telecommunication service provider network 170. For instance, different application servers may be assigned with similar functions and responsibilities for generating strategies and fulfilling intents with regard to different network slices, e.g., different access networks, different portions of EPC network 105 (e.g., different MMEs, SGWs, etc.), and so forth. For instance, application servers for implementing a plurality of policies according to a strategy composed in accordance with a state exploration process to place a telecommunication network in a desired network state may be deployed on a per-zone, per-region basis, e.g., corresponding to 10 cells, a county, a state, etc. In such an example, network state may be tracked per-zone/per-region, and intents may be specified and fulfilled on such a per-zone/per-region basis.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 145 of FIG. 1 may represent an application function (AF) for determining settings for parameters of a radio access network via a reinforcement learning agent comprising a plurality of sub-agents, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
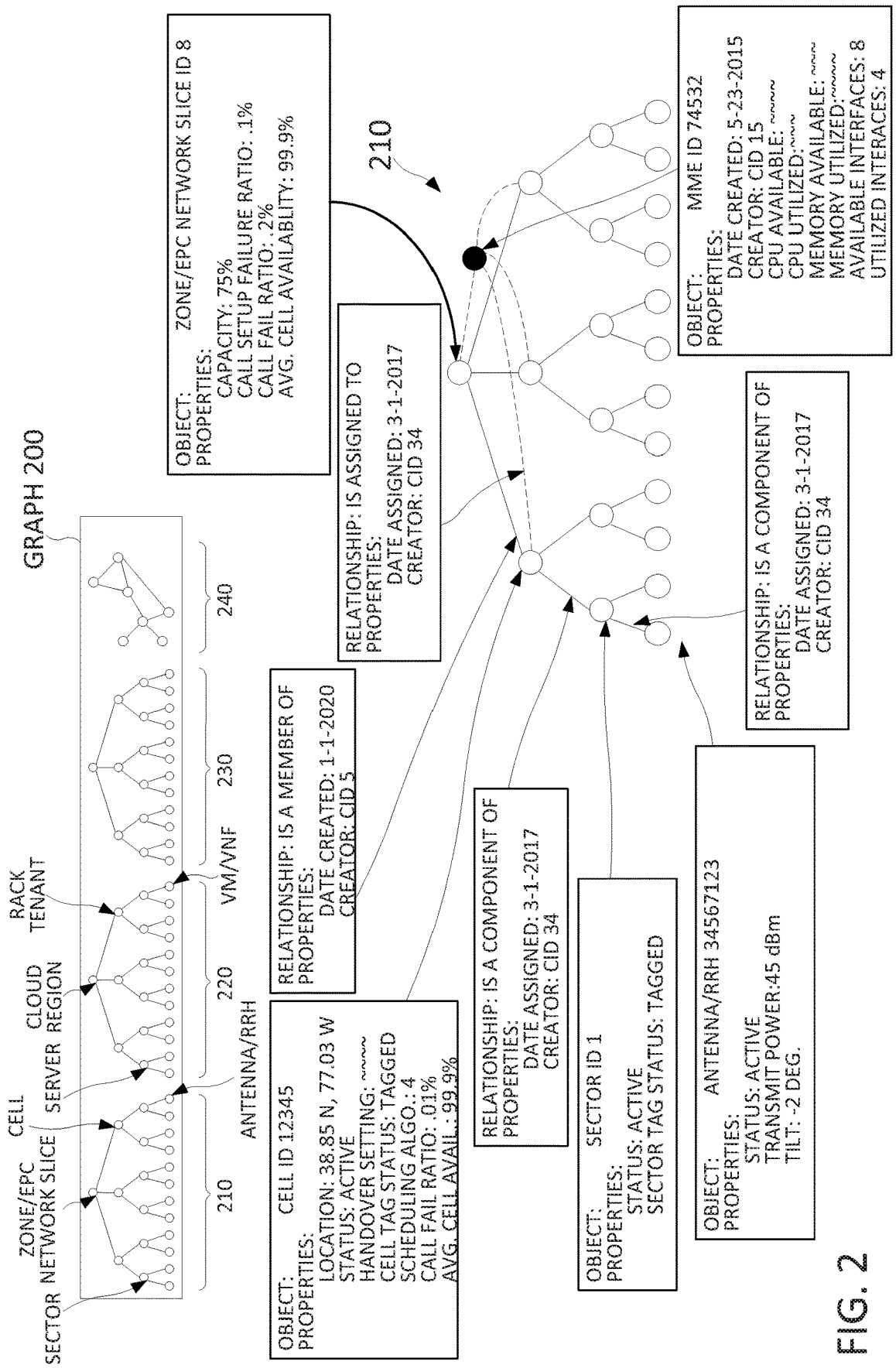
FIG. 2 illustrates an example graph representing a telecommunication network, according to the present disclosure.

FIG. 2 illustrates an example graph 200 (e.g., a graph database) representing a telecommunication network, in accordance with the present disclosure. For instance, graph 200 may represent telecommunication service provider network 170 of FIG. 1. As illustrated in FIG. 2, the graph 200 may be organized according to a schema that emphasizes hierarchical relationships among objects (e.g., nodes/vertices) representing components or aspects of the telecommunication network. For instance, a first portion 210 of the graph 200 illustrates a hierarchical relationship with a first tier associated with a network zone, e.g., an Evolved Packet Core (EPC) zone and/or a network slice, a second tier associated with individual cells, a third tier associated with cell sectors, and a fourth tier associated with antennas, or remote radio heads (RRHs), where each of the objects at a respective tier represents a zone/EPC network slice, cell, sector, or antenna/RRH, respectively. It should be noted that the foregoing is just one example of a hierarchical structure for at least a portion of the graph 200 relating to cellular infrastructure of the telecommunication network. For instance, in other, further, and different examples, more or less tiers may be utilized. For example, a tier for antennas may be omitted, and details regarding antennas/RRHs may be captured in the graph as "properties" of sector objects.

As another example, graph 200 may include a second portion 220 having a hierarchical structure in which a first tier is associated with cloud regions (of the telecommunication network), a second tier associated with rack tenants, a third tier associated with servers (e.g., within each rack), and a fourth tier associated with virtual machines (VMs) and/or virtual network functions (VNFs) hosted on the servers. For illustrative purposes, a third portion 230 of the graph 200 is illustrated in a hierarchical structure and may be reflective of a physical architecture of cellular network infrastructure or SDN infrastructure. As further illustrated in FIG. 2, the graph 200 further includes a fourth portion 240 having a non-hierarchical structure, which may be reflective of physical links among geographically distributed data centers, layer 1 optical networking components (e.g., optical add-drop multiplexers, optical transport links, optical transceivers or transponders, etc.), and so forth. Insofar as a telecommunication network may be a multifaceted system (for example, a cellular network may include cloud-RAN infrastructure, such as vMMEs, vSGWs, etc., and may use optical transport infrastructure for backhaul and links among core network components that may be geographically distributed), it should be noted that the portions 210-240 of the graph 200 are not necessarily isolated data structures (or "silos"). Thus, for illustrative purposes, various possible "relationships" or links among objects in the different portions 210-240 are omitted from specific representation in the graph 200 of FIG. 2. However, it should be understood that such "relationships" can and may in fact exist in a graph that is representative of a telecommunication network.

As further illustrated in FIG. 2, a more detailed view of the portion 210 is shown. For instance, a first tier object is for "zone/EPC network slice ID 8." For instance, different cellular network zones, or EPC slices may be defined by identifiers (IDs). As further illustrated, the object for "zone/EPC network slice ID 8" has several properties, including "capacity," "call setup failure ratio," "call failure ratio," and "average cell availability." These properties may be aggregated from different cells within the zone and may comprise state information that may be obtained in the same or similar manner as described above in connection with the example of FIG. 1. At a second tier, there is an object for "cell ID 12345." This object has properties of "location," "status," "handover setting," "cell tag status," "scheduling algorithm," "call fail ratio," and "average cell availability." It should be noted that some of these properties may comprise current settings for various configurable parameters, while others may comprise performance indicators that may be measured and monitored, but which cannot be controlled directly.

The link between the object (also referred to as a node or vertex) for "zone/EPC network slice ID 8" and the object for "cell ID 12345" comprises a "relationship" which may be one of several types of relationships that are defined according to a schema for the graph, such as "is a member of," "is a component of," "is controlled by," "is assigned to," "is connected to," etc. In this case, the relationship between "zone/EPC network slice ID 8" and the object for "cell ID 12345" is: "is a member of." In one example, relationships may also have properties. For instance, this particular relationship has the properties of "date created" and "creator ID." For example, certain components or configurations of the telecommunication network may be created by network operations personnel or automated systems, each of which may be assigned a creator identifier (CID). Thus, for example, a network slice may be created by a network operations personnel having a CID 5, who may have configured the cell having cell ID 12345 to be a member of the zone/EPC slice having ID 8.

Other objects and relationships, and the properties thereof are as shown in FIG. 2. As also depicted in FIG. 2, in addition to a hierarchy of a zone/EPC network slice object and cell objects for cells that are members of the zone, there may be objects for EPC components, such as the object for a mobility management entity (MME), e.g., "MME ID 74532." This object may have various properties relating to configurable parameters and performance indicators. This object also has relationships with cell objects and the zone/EPC network slice object. For instance, the relationship with the object for "cell ID 12345" indicates an "is assigned to" relation between the objects. In other words, the cell having cell ID 12345 is assigned to the MME having MME ID 74532. The relationship was created on Jan. 1, 2020 by an entity assigned CID 5. For instance, CID 5 may correspond to a SDN controller which may have created MME having MME ID 74532 and assigned the cell having cell ID 12235 to be associated with this particular MME. Although this association may be implied by the illustrated hierarchy, this specific relationship is included in the example portion 210 of graph 200 to demonstrate that the present disclosure is not limited to a particular schema for a graph representing a telecommunication network (such as a purely hierarchical structure).

Figure 3:
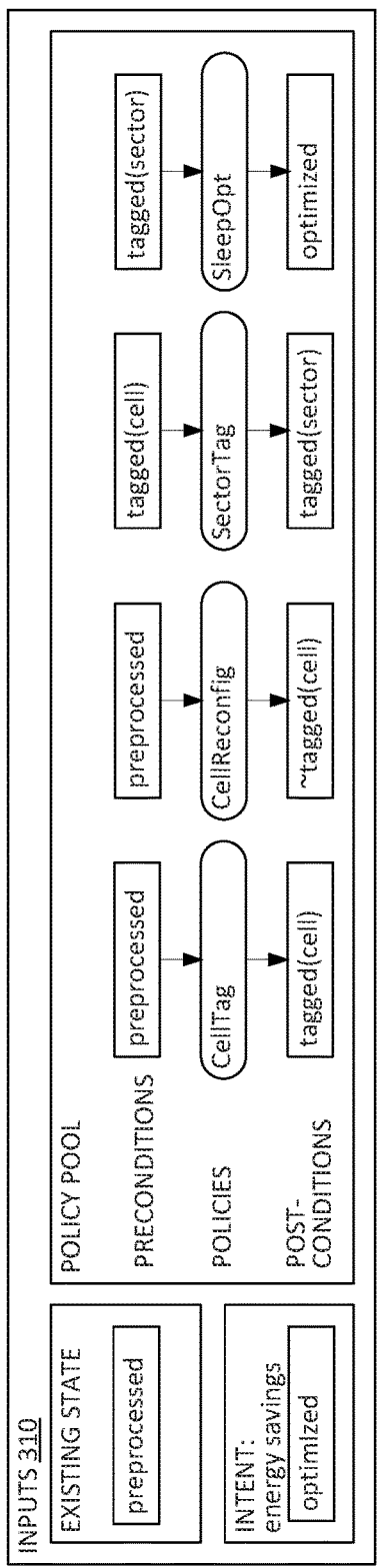
FIG. 3 illustrates an example of a state exploration process, according to the present disclosure.
Figure 3:
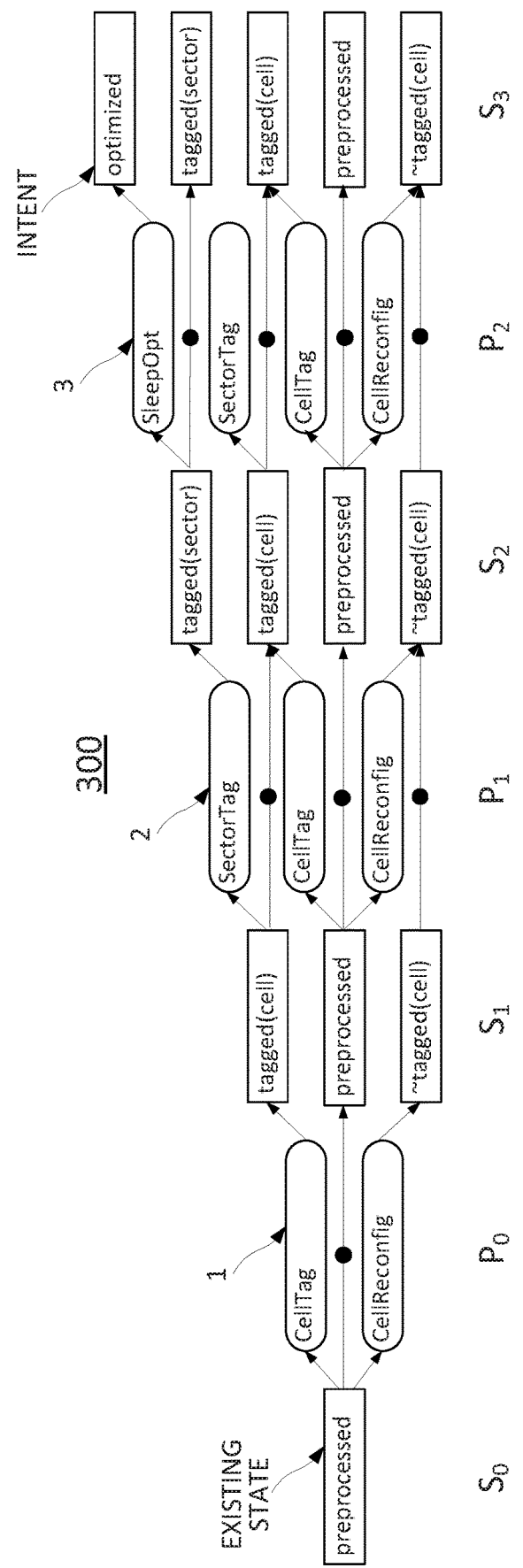

FIG. 3 illustrates an example state exploration process 300 in accordance with the present disclosure. For instance, as illustrated in FIG. 3, the state exploration process may have several inputs 310, including an existing state (e.g., an existing state of the telecommunication network which may be characterized or represented by a graph, such as the graph 200 of FIG. 2 (and which may be derived from network topology information, configuration settings, and/or performance indicators, such as described above)). In one example, for purposes of the state exploration process 300, network states may be defined according to logical expressions which are evaluated over various aspects of state information of the graph. In the present example, the "existing state" is evaluated and determined to be "preprocessed" according to the logical expression which defines the network state of "preprocessed." Continuing with the present example, another one of the inputs 310 is the "intent," which in this case may comprise "energy savings," and which may be quantified as a network state of "optimized" (indicating sleep-optimized).

Additional inputs 310 include the available policies, comprising actions which may be taken in the communication network (and which may be simulated or evaluated in the state exploration process 300). As noted above, each of the properties has a precondition and post-condition, which may be defined as a logical expression comprising a predicate on a domain represented by the graph (a Boolean expression with variables comprising information taken from the graph (e.g., representing network state)) or a literal on a the domain represented by the graph (an atomic formula (or its negation) (which can be a predicate symbol applied to terms/variables comprising information taken from the graph)).

As illustrated in FIG. 3, the state exploration process begins in state $S_0$ (the existing state, which may comprise a current state or a most-recently evaluated network state of the telecommunication network as represented by the graph), which is "preprocessed." At phase $P_0$, policies from the policy pool are considered for application/execution within the telecommunication network. In this case, the policies "CellTag" and "CellReconfig" are considered at phase $P_0$. Notably, these policies have preconditions corresponding to the state "preprocessed" while other policies in the policy pool have preconditions which are not satisfied. Specifically, "tagged(cell)" and "tagged(sector)" are not evaluable to "true" and thus, preconditions for "SectorTag" and "SleepOpt" are not met.

States $S_1$ represent the results of taking the actions corresponding to policies "CellTag" and "CellReconfig" (as well as the choice of applying no policy/taking no action). Notably, the resulting states $S_1$ from "CellTag" and "CellReconfig" policies are quantified by the respective post-conditions of "tagged(cell)" and "~tagged(cell)" as indicated by the respective policy "signatures." Each of the states $S_1$ is then taken as a starting point for consideration of possible policies to apply at phase $P_1$ (or choices of applying no policy/taking no action). In this case, "CellTag" and "CellReconfig" remain possible policies to apply from the "preprocessed" state. There are no policies that may be applied from the "~tagged(cell)" state. However, the "SectorTag" policy may now be applied since the precondition of "tagged(cell)" is true according to one of the states in $S_1$.

States $S_2$ represent the results of taking the actions corresponding to policies illustrated at $P_1$ (as well as the choices of applying no policy/taking no action from respective states in $S_1$). In this case, "CellTag" and "CellReconfig" remain possible policies to apply from the "preprocessed" state, and "SectorTag" remains a policy that may be applied from the "tagged(cell)" state. There remain no policies that may be applied from the "~tagged(cell)" state. However, the "SleepOpt" (sleep optimize) policy may now be applied since the precondition of "tagged(sector)" is true according to one of the states in $S_2$. States $S_3$ represent the results of taking the actions corresponding to policies illustrated at $P_2$ (as well as the choices of applying no policy/taking no action from respective states in $S_2$).

Notably, one of the resulting states in $S_3$ is "optimized," which is the post-condition of the policy "SleepOpt", and which is the state that defines the high-level intent of "energy savings." In this case, the state exploration process 300 may end since the state corresponding to the intent has been reached, starting from the existing state. In particular, the set/sequence of policies (1) "CellTag", (2) "SectorTag", and (3) "SleepOpt" may be returned as a result comprising a strategy to fulfill the intent, given the existing state and the set of available policies in the policy pool. It should be noted that the foregoing is just one example of how state exploration may proceed in accordance with a graph representing a telecommunication network (to provide states, or more specifically "network states"), a policy pool having policies defined as predicates and/or literals over the domain comprising the graph, and a set of available intents from which an intent may be selected. For instance, the state exploration process may be implemented via a satisfiability modulo theories (SMT) solver, such as Stanford Research Institute Problem Solver (STRIPS), a CVC3 solver, a CVC4 solver, a SATPLAN solver, a BLACKBOX solver, a Graphplan solver, or the like.

In addition, in one example, a plurality of costs may be assigned to each of the plurality of policies, where when the state exploration process 300 identifies a plurality of sequences of state transitions to obtain the desired network state from the existing network state, the composing of the strategy may comprise selecting a least-cost sequence from the plurality of sequences. For instance, multiple sequences/paths may be found via the state exploration process 300 that may result in the desired network state according to the intent. Thus, the state exploration process 300 may include selecting from among the possible solutions. In another example, all of the possible solutions may be presented to a user for selection among the choices. For instance, the respective solutions and their associated costs may be presented to the user. In addition, in one example, the user may select from different cost models, and the respective costs may be re-evaluated and/or updated to reflect the selected cost model, after which the user may select from among the respective solutions. For instance, according to different cost models, a "cost" may comprise a monetary cost, a time cost, an energy utilization cost, etc., or a cost measure comprising a composite of any of the foregoing factors, or different factors. Thus, these and other modifications are all contemplated within the scope of the present disclosure.

FIG. 4 illustrates, a flowchart of an example method 400 for implementing a plurality of policies according to a strategy composed in accordance with a state exploration process to place a telecommunication network in a desired network state. In one example, steps, functions and/or operations of the method 400 may be performed by a device as illustrated in FIG. 1, e.g., by AS 145 or network controller 102, and/or or any one or more components thereof, or by AS 145 or network controller 102, and/or any one or more components thereof in conjunction with one or more other components of the system 100, such as one or more of AS 145, network controller 102, cell sites 111-113, BBU pool 114, and so forth. In one example, the steps, functions, or operations of method 400 may be performed by a computing device or processing system, such as computing system 500, and/or a hardware processor element 502 as described in connection with FIG. 5 below. For instance, the computing system 500 may represent at least a portion of an application server or other device(s) in accordance with the present disclosure. For illustrative purposes, the method 400 is described in greater detail below in connection with an example performed by a processing system. In one example, the steps, functions, or operations of method 400 may be performed by a processing system comprising a plurality of such computing devices as represented by the computing system 500. The method 400 begins in step 405 and may proceed to optional step 410 or to step 430.

At optional step 410, the processing system may obtain or create a graph representing a telecommunication network. For instance, the graph may comprise a plurality of objects and a plurality of relationships or links representing a plurality of associations between the plurality of objects, where each of the plurality of objects comprises one or more properties (e.g., settings for configurable parameters, performance indicators, and/or other data comprising information about the object, such as the date created and/or deployed, the creating or authorizing entity, a model number, a software version, a manufacturer identifier, or other non-configurable, fixed, or relatively fixed characteristics). To illustrate, the graph may be derived from an A&AI system and may be enhanced with additional state information obtained from the telecommunication network, such as described above. In accordance with the present disclosure, each of the plurality of objects may represent one of: a physical network function, a virtual network function, or a network zone. For instance, physical network functions may comprise physical components of an access network portion of the telecommunication network, physical components of a core network portion of the telecommunication network, etc. Similarly, virtual network functions may comprise virtual components of an access network portion of the telecommunication network or virtual components of a core network portion of the telecommunication network.

In one example, each of the plurality of relationships represents a physical link in the telecommunication network or a hierarchical relationship among at least two of the plurality of objects. For instance, hierarchical relationships that may be represented in the graph include: a first object of the plurality of objects being a component of a second object of the plurality of objects, the first object of the plurality objects being hosted on a second object of the plurality of objects, the first object of the plurality of objects being managed by the second object of the plurality of objects, etc.

In one example, the plurality of relationships may also include other types of relationships, such as logical communicative relationships. For instance, a relationship may comprise "is a peer of," and may represent a tunnel, or label-switched path between two routers via a Multi-Protocol Label Switching (MPLS) network architecture. It should be noted that in some examples, physical links, such as fiber optic cables, may alternatively or additionally be represented as "objects" (or nodes/vertices) in the graph (e.g., as an alternative or in addition to being represented via one or more "relationships" or edges/links in the graph).

At optional step 420, the processing system may obtain policies and intents that may be utilized in accordance with the example method 400. For instance, the policies and intents may be obtained from devices of network operations personnel who may be tasked with provisioning such policies and intents. In one example, the policies may comprise actions that may be implemented by the processing system via the telecommunication network (e.g., settings that may be selected for configurable parameters of various components of the telecommunication network, and which may be effected via instructions to various components, either directly, such as via vendor APIs for respective components, via a network controller or the like, and so forth). In one example, each of the plurality of policies has a precondition and a post-condition. For instance, each of the preconditions and post-conditions may be defined as logical expression comprising a predicate on a domain represented by the graph or a literal on the domain represented by the graph. In addition, each of the plurality of policies may comprise an atomic action or a plurality of sub-policies comprising a set of actions to be performed as a group. The intents may comprise predefined intents, which are goals that may be achieved via utilization of multiple policies. In one example, the intents may be defined by a desired network state (e.g., characteristics of the telecommunication network) as represented by a state of the graph representing the telecommunication network. In one example, the intents may also be defined by a level of the intent, such as conservative-moderate-aggressive, a range of levels 1-5, etc.

At step 430, the processing system obtains a selection of an intent comprising a desired network state for a telecommunication network. In one example, the desired network state is defined in accordance with a graph that represents the telecommunication network, where the graph comprises a plurality of objects and a plurality of relationships or links/edges between the plurality of objects, and where each of the plurality of objects comprises one or more properties. For instance, the intent may be one of a plurality of available intents that are made available and from which a user may select an intent. For example, as presented to the user, the intents may be, for example: "energy savings," "coverage optimization," "traffic offload," "blacklisting," "safe-guard," "reboot," and so forth. However, from the perspective of the processing system and for purposes of the state exploration process to follow at step 450, the intents may comprise the desired network states defined in accordance with the graph.

At step 440, the processing system determines an existing network state of the telecommunication network, where the existing network state is also defined in accordance with the graph that represents the telecommunication network. For instance, the processing system may obtain and/or may maintain the graph which is representative of a current state, a recent network state, a most-recently evaluated network state of the telecommunication network, etc. (e.g., the "existing network state").

At step 450, the processing system composes a strategy comprising a plurality of policies to obtain the desired network state from the existing network state. As noted above, each of the plurality of policies may comprise an action that may be implemented in the telecommunication network. In one example, step 450 comprises performing a state exploration process over the graph, where each state transition of the state exploration process corresponds to an application of a policy of the plurality of policies. For instance, the plurality of policies may include a preprocess policy, a cell tag policy, a cell reconfiguration policy, a sector tag policy, a sleep optimization policy, and so forth. In one example, the state exploration process may be implemented via a satisfiability modulo theories (SMT) solver.

In one example, the state exploration process comprises identifying a first group of policies from among the plurality of policies having preconditions that are satisfied by the existing network state and simulating respective actions of each of the first group of policies, where the simulating comprises modifying the graph from the existing network state in accordance with respective post-conditions of the first group of policies, and which results in the generation of a first plurality of modified graphs representing a first plurality of simulated network states for the telecommunication network. For instance, in one example, the state exploration process of step 450 may be in accordance with the example of FIG. 3. Thus, for example, the foregoing actions may correspond to phase $P_0$ and may result in the states at $S_1$.

The state exploration process of step 450 may further include identifying a second group of policies from among the plurality of policies having preconditions that are satisfied by a respective simulated network state of the first plurality of network states that is represented by the at least one of the first plurality of modified graphs, and simulating respective actions of each of the second group of policies. For instance, the simulating may comprise modifying at least one of the first plurality of modified graphs from the respective simulated network state in accordance with respective post-conditions of the second group of policies. In addition, the simulating may generate a second plurality of modified graphs representing a second plurality of simulated network states for the telecommunication network. For instance, in an example relating to the state exploration process 300 of FIG. 3, the foregoing actions may correspond to phase $P_1$, and may result in the states at $S_2$. Step 450 may include further operations of the same or a similar nature for subsequent phases until a simulated network state is obtained that comprises the desired network state. For instance, the state exploration process may end when a simulated network state is obtained that comprises the desired network state.

The path via the state exploration process that results in the desired network state may then be selected for composing a strategy to achieve the desired network state from the existing network state. For instance, composing the strategy may include selecting at least a first policy from the first group of policies and a second policy from the second group of policies for the strategy, where simulated actions of the at least the first policy and the second policy comprise a sequence of state transitions that resulted in the desired network state from the existing network state. For instance, in the illustrative example of FIG. 3, the state transitions may comprise a transition from the state at $S_0$ (e.g., "pre-processed") to one of the states in $S_1$ (e.g., "tagged(cell)"), a transition from the "tagged(cell)" state in $S_1$ to the "tagged (sector)" state in $S_2$, and a transition from the "tagged (sector)" state in $S_2$ to the desired network state "optimized" in $S_3$. Thus, in such an example, the path may include the set/sequence of policies (1) "CellTag," (2) "SectorTag," and (3) "SleepOpt."

In one example, the state exploration process of step 450 may find multiple paths that reach the desired network state. In such case, step 450 may include making a selection among the options comprising the multiple paths, or may include presenting the paths as options to a user, from among which the user may select a particular path as a strategy for implementation to fulfill the selected intent. In one example, one or more costs may be assigned to each of the plurality of policies, where when the state exploration process identifies a plurality of sequences of state transitions to obtain the desired network state from the existing network state, the composing of the strategy may comprise selecting a least-cost sequence from the plurality of sequences. In another example, all of the possible solutions may be presented to a user for selection among the choices. For instance, the respective solutions and their associated costs may be presented to the user. In addition, in one example, the user may select from different cost models, and the respective costs may be re-evaluated and/or updated to reflect the selected cost model, after which the user may select from among the respective solutions.

At step 460, the processing system implements the plurality of policies according to the strategy, where the implementing is to place the telecommunication network in the desired network state. For instance, the processing system may communicate with cell sites, core network components, etc., and/or one or more components thereof, such as eNodeB's, remote radio heads (RRHs), BBU pools, host devices, VMs, and so forth via various control interfaces (e.g., vendor APIs) to remotely adjust settings for various configurable parameters in accordance with the policies/actions. Alternatively, or in addition, the processing system may communicate with a network controller to provide one or more instructions to implement the set of policies, where the network controller may communicate with various components of the telecommunication network in the same or a similar manner.

Following step 460, the method 400 proceeds to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400 with respect to additional intents. In one example, the method 400 may be expanded to include obtaining new or additional policies or intents. In one example, the method 400 may be expanded to include obtaining updated network state information (e.g., parameters settings that may be adjusted in some other way, such as manual configurations outside of the bounds of the method 400, adjustments automatically made by or via a SDN controller and/or SON orchestrator, performance indicator measurements reflective of changes in the telecommunication network, and so forth. Thus, these and other modifications are all contemplated within the scope of the present disclosure.

In addition, although not expressly specified above, one or more steps of the example method 400 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1 or described in connection with the examples of FIGS. 2-4 may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for implementing a plurality of policies according to a strategy composed in accordance with a state exploration process to place a telecommunication network in a desired network state, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, it should be noted that the computing device may employ a plurality of hardware processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for implementing a plurality of policies according to a strategy composed in accordance with a state exploration process to place a telecommunication network in a desired network state (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for implementing a plurality of policies according to a strategy composed in accordance with a state exploration process to place a telecommunication network in a desired network state (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

obtaining, by a processing system including at least one processor, a selection of an intent comprising a desired network state for a telecommunication network;

determining, by the processing system, an existing network state of the telecommunication network, wherein the desired network state and the existing network state are defined in accordance with a graph that represents the telecommunication network, wherein the graph comprises a plurality of objects and a plurality of relationships between the plurality of objects, and wherein each of the plurality of objects comprises one or more properties;

composing, by the processing system, a strategy comprising a plurality of policies to obtain the desired network state from the existing network state, wherein each of the plurality of policies comprises an action that is to be implemented in the telecommunication network, wherein the composing comprises performing a state exploration process over the graph, and wherein each state transition of a plurality of state transitions of the state exploration process corresponds to a policy of the plurality of policies, wherein each of the plurality of policies has a precondition and a post-condition, and wherein the state exploration process comprises:

identifying a first group of policies from among the plurality of policies having preconditions that are satisfied by the existing network state; and simulating a respective action of each of the first group of policies, wherein the simulating comprises modifying the graph from the existing network state in accordance with respective post-conditions of the first group of policies, wherein the simulating generates a first plurality of modified graphs representing a first plurality of simulated network states for the telecommunication network; and implementing, by the processing system, the plurality of policies according to the strategy, wherein the implementing is to place the telecommunication network in the desired network state.

2. The method of claim 1, wherein each of the plurality of objects represents one of:

a physical network function;
a virtual network function; or
a network zone.

3. The method of claim 2, wherein the physical network function comprises:

a physical component of an access network portion of the telecommunication network; or
a physical component of a core network portion of the telecommunication network.

4. The method of claim 2, wherein the virtual network function comprises:

a virtual component of an access network portion of the telecommunication network; or
a virtual component of a core network portion of the telecommunication network.

5. The method of claim 1, wherein each of the plurality of relationships represents one of:

a physical link in the telecommunication network; or
a hierarchical relationship among at least two of the plurality of objects.

6. The method of claim 5, wherein the hierarchical relationship comprises:

a first object of the plurality of objects being a component of a second object of the plurality of objects;
the first object of the plurality objects being hosted on the second object of the plurality of objects; or
the first object of the plurality of objects being managed by the second object of the plurality of objects.

7. The method of claim 1, wherein the preconditions are determined to be satisfied from a network state according to the graph.

8. The method of claim 7, wherein the state exploration process further comprises, for at least one of the first plurality of modified graphs:

identifying a second group of policies from among the plurality of policies having preconditions that are satisfied by a respective simulated network state of the first plurality of network states that is represented by the at least one of the first plurality of modified graphs; and simulating a respective action of each of the second group of policies, wherein the simulating comprises modifying at least one of the first plurality of modified graphs from the respective simulated network state in accordance with respective post-conditions of the second group of policies, wherein the simulating generates a second plurality of modified graphs representing a second plurality of simulated network states for the telecommunication network.

9. The method of claim 8, wherein the state exploration process ends when a simulated network state is obtained that comprises the desired network state.

10. The method of claim 9, wherein the state exploration process assigns at least one cost to each of the plurality of policies, wherein when the state exploration process identifies a plurality of sequences of state transitions to obtain the desired network state from the existing network state, the composing of the strategy comprises selecting a least-cost sequence from the plurality of sequences.

11. The method of claim 9, wherein the composing of the strategy comprises:

selecting at least a first policy from the first group of policies and a second policy from the second group of policies for the strategy, wherein simulated actions of the at least the first policy and the second policy comprise a sequence of state transitions that result in the desired network state from the existing network state.

12. The method of claim 1, wherein each of the precondition and post-condition is defined as a logical expression comprising:

a predicate on a domain represented by the graph; or
a literal on the domain represented by the graph.

13. The method of claim 1, wherein the plurality of policies includes two or more of:

a preprocess policy;
a cell tag policy;
a cell reconfiguration policy;
a sector tag policy; or
a sleep optimization policy.

14. The method of claim 1, wherein the intent comprises one of:

an energy savings intent;
a traffic offload intent;

a blacklisting intent;
a safe-guard intent; or
a reboot intent.

15. The method of claim, 1, wherein the intent includes a level of the intent.

16. The method of claim 1, wherein each of the plurality of policies comprises:
an atomic action; or
a plurality of sub-policies comprising a set of actions to be performed as a group.

17. A non-transitory computer-readable medium storing instructions which, when executed by a processing system including at least one processor, cause the processing system to perform operations, the operations comprising:
obtaining a selection of an intent comprising a desired network state for a telecommunication network;
determining an existing network state of the telecommunication network, wherein the desired network state and the existing network state are defined in accordance with a graph that represents the telecommunication network, wherein the graph comprises a plurality of objects and a plurality of relationships between the plurality of objects, and wherein each of the plurality of objects comprises one or more properties;
composing a strategy comprising a plurality of policies to obtain the desired network state from the existing network state, wherein each of the plurality of policies comprises an action that is to be implemented in the telecommunication network, wherein the composing comprises performing a state exploration process over the graph, and wherein each state transition of a plurality of state transitions of the state exploration process corresponds to a policy of the plurality of policies, wherein each of the plurality of policies has a precondition and a post-condition, and wherein the state exploration process comprises:
identifying a first group of policies from among the plurality of policies having preconditions that are satisfied by the existing network state; and
simulating a respective action of each of the first group of policies, wherein the simulating comprises modifying the graph from the existing network state in accordance with respective post-conditions of the first group of policies, wherein the simulating generates a first plurality of modified graphs representing a first plurality of simulated network states for the telecommunication network; and
implementing the plurality of policies according to the strategy, wherein the implementing is to place the telecommunication network in the desired network state.

18. An apparatus comprising:
a processing system including at least one processor; and
a computer-readable medium storing instructions which, when executed by the processing system, cause the processing system to perform operations, the operations comprising:
obtaining a selection of an intent comprising a desired network state for a telecommunication network;
determining an existing network state of the telecommunication network, wherein the desired network state and the existing network state are defined in accordance with a graph that represents the telecommunication network, wherein the graph comprises a plurality of objects and a plurality of relationships between the plurality of objects, and wherein each of the plurality of objects comprises one or more properties;
composing a strategy comprising a plurality of policies to obtain the desired network state from the existing network state, wherein each of the plurality of policies comprises an action that is to be implemented in the telecommunication network, wherein the composing comprises performing a state exploration process over the graph, and wherein each state transition of a plurality of state transitions of the state exploration process corresponds to a policy of the plurality of policies, wherein each of the plurality of policies has a precondition and a post-condition, and wherein the state exploration process comprises:
identifying a first group of policies from among the plurality of policies having preconditions that are satisfied by the existing network state; and
simulating a respective action of each of the first group of policies, wherein the simulating comprises modifying the graph from the existing network state in accordance with respective post-conditions of the first group of policies, wherein the simulating generates a first plurality of modified graphs representing a first plurality of simulated network states for the telecommunication network; and
implementing the plurality of policies according to the strategy, wherein the implementing is to place the telecommunication network in the desired network state.

19. The apparatus of claim 18, wherein each of the plurality of objects represents one of:
a physical network function;
a virtual network function; or
a network zone.

20. The apparatus of claim 19, wherein the physical network function comprises:
a physical component of an access network portion of the telecommunication network; or
a physical component of a core network portion of the telecommunication network.

* * * * *